(12) United States Patent
Sole et al.

(10) Patent No.: US 9,615,108 B2
(45) Date of Patent: Apr. 4, 2017

(54) METHODS AND APPARATUS FOR ADAPTIVE PROBABILITY UPDATE FOR NON-CODED SYNTAX

(75) Inventors: Joel Sole, Princeton, NJ (US); Liwei Guo, Plainsboro, NJ (US); Peng Yin, Ithaca, NY (US); Yunfei Zheng, Plainsboro, NJ (US); Xiaoan Lu, Priinceton, NJ (US); Qian Xu, Plainsboro, NJ (US)

(73) Assignee: THOMSON LICENSING, Issy-les Moulineaux (FR)

( * ) Notice: Subject to any disclaimer, the term of this patent is extended or adjusted under 35 U.S.C. 154(b) by 388 days.

(21) Appl. No.: 13/376,640

(22) PCT Filed: Jun. 29, 2010

(86) PCT No.: PCT/US2010/001861
§ 371 (c)(1),
(2), (4) Date: Mar. 22, 2012

(87) PCT Pub. No.: WO2011/008243
PCT Pub. Date: Jan. 20, 2011

(65) Prior Publication Data
US 2012/0177129 A1    Jul. 12, 2012

Related U.S. Application Data

(60) Provisional application No. 61/221,201, filed on Jun. 29, 2009.

(51) Int. Cl.
*H04N 7/12*    (2006.01)
*H04N 19/61*   (2014.01)
(Continued)

(52) U.S. Cl.
CPC ............ *H04N 19/61* (2014.11); *H04N 19/13* (2014.11); *H04N 19/159* (2014.11); (Continued)

(58) Field of Classification Search
USPC ..................................... 375/240.24
See application file for complete search history.

(56) References Cited

U.S. PATENT DOCUMENTS 6,954,156 B2    10/2005    Kadono et al.
7,190,289 B2     3/2007    Kobayashi et al.
(Continued)

FOREIGN PATENT DOCUMENTS

CN    100495931    6/2009
EP     1501313     1/2005
(Continued)

OTHER PUBLICATIONS

Marpe et al., "Context-Based Adaptive Binary Arithmetic Coding in the H.264/AVC Video Compression Standard", IEEE Transactions on Circuits and Systems for Video Technology, vol. 13, No. 7, Jul. 2003, pp. 620-636.
(Continued)

*Primary Examiner* — Tracy Y Li
(74) *Attorney, Agent, or Firm* — Brian S. Dorini; Ronald J. Kolczynski (57) ABSTRACT

There is provided an apparatus. The apparatus includes an encoder (100) for encoding picture data for at least a block. The encoder (100) applies a probability update process to at least one of a non-coded symbol and a non-coded syntax associated with the block.

19 Claims, 8 Drawing Sheets

(51) Int. Cl.
*H04N 19/159* (2014.01)
*H04N 19/176* (2014.01)
*H04N 19/70* (2014.01)
*H04N 19/46* (2014.01)
*H04N 19/13* (2014.01)

(52) U.S. Cl.
CPC ........... *H04N 19/176* (2014.11); *H04N 19/46* (2014.11); *H04N 19/70* (2014.11)

(56) References Cited

U.S. PATENT DOCUMENTS

| | | |
|---|---|---|
| 8,188,895 B2 | 5/2012 | Sekiguchi et al. |
| 2004/0151252 A1 | 8/2004 | Sekiguchi et al. |
| 2005/0052294 A1* | 3/2005 | Liang et al. ..................... 341/63 |
| 2006/0158355 A1* | 7/2006 | Jeon et al. ....................... 341/50 |
| 2006/0202872 A1* | 9/2006 | Kobayashi et al. ............ 341/50 |
| 2007/0071105 A1* | 3/2007 | Tian .................... H04N 19/176 375/240.24 |
| 2007/0263723 A1 | 11/2007 | Sekiguchi et al. |
| 2008/0219578 A1* | 9/2008 | Lee ................................ 382/247 |
| 2009/0110067 A1* | 4/2009 | Sekiguchi et al. ....... 375/240.12 |
| 2010/0177585 A1* | 7/2010 | Rubinstein .......... G06F 13/1663 365/230.05 |

FOREIGN PATENT DOCUMENTS

| | | |
|---|---|---|
| EP | 1515446 | 3/2005 |
| JP | 2004-129206 A | 4/2004 |
| JP | 2005-347780 A | 12/2005 |
| JP | 2006238453 A | 9/2006 |
| JP | 2008259224 A | 10/2008 |

OTHER PUBLICATIONS

ITU-T H.264 Standard. "Advanced Video Coding for Generic Audiovisual Services", International Telecommunication Union, Mar. 2005.

Search Report dated Oct. 21, 2010.

* cited by examiner

METHODS AND APPARATUS FOR ADAPTIVE PROBABILITY UPDATE FOR NON-CODED SYNTAX

CROSS-REFERENCE TO RELATED APPLICATIONS

This application claims the benefit, under 35 U.S.C. §365 of International Application PCT/US2010/001.861, filed 29 Jun. 2010, which was published in accordance with PCT Article 21(2) on 23 Jan. 2011, in English and which claims the benefit of U.S. provisional patent application No. 61/221,201 filed 29 Jun. 2009.

TECHNICAL FIELD

The present principles relate generally to video encoding and decoding and, more particularly, to methods and apparatus for adaptive probability update for non-coded syntax.

BACKGROUND

Probability estimation plays an important role in arithmetic coding. A general method is to use a finite-state machine to estimate probabilities. Roughly speaking, a 0 (or 1) encountered for a given class of symbol causes the machine to transit to a new state specifying a lower (or higher, respectively) probability of the value 1, which is then used to code the next symbol from the same class. The state machine has the further benefit of allowing pre-calculated values for various coding parameters to be attached to each probability state.

The International Organization for Standardization/International Electrotechnical Commission (ISO/IEC) Moving Picture Experts Group-4 (MPEG-4) Part 10 Advanced Video Coding (AVC) standard/International Telecommunication Union, Telecommunication Sector (ITU-T) H.264 Recommendation (hereinafter the "MPEG-4 AVC Standard") assumes that the estimated probabilities of each context model can be represented by a sufficiently limited set of representative values.

The MPEG-4 AVC Standard employs a Context-Based Adaptive Binary Arithmetic Coding (CABAC) framework to code the syntax. CABAC achieves good compression performance through the following: (a) selecting probability models for each syntax element according to the element's context; (b) adapting probability estimates based on local statistics; and (c) using arithmetic coding. The probabilities estimation is only updated after each symbol is encoded.

For CABAC, 64 representative probability values p∈[0.01875, 0.5] were derived for the LPS (Least Probable Symbol) by the following recursive equation:

$$p_\sigma = \alpha \cdot p_{\sigma-1} \text{ for all } \sigma = 1, 2, \ldots 63 \text{ with } \alpha = \left(\frac{0.01875}{0.5}\right)^{\frac{1}{63}} \approx 0.95 \text{ and}$$

$$p_0 = 0.5, N = 64.$$

The probability estimation is updated after each symbol is encoded. The selection of $\alpha$ and cardinality $N$ is important. The selections represent a compromise between the desire for fast adaptation and the need for a sufficient stable and accurate estimate. In the MPEG-4 AVC Standard, the basic coding unit is a slice. This restricts the probability adaptation such that it cannot exceed the duration of the whole slice encoding process.

The MPEG-4 AVC Standard employs SKIP/Direct mode, which assumes that certain syntax, such as the mode/motion or the coefficient information (or other information), can be inferred from already available decoded information, so we do not need to code the syntax at all. However, in some cases, we find out that this can cause some damage in future coding of the corresponding syntax. One reason might be due to the limitation of the probability estimation process. One possibility is that probability converges too slowly or that the estimation is very unstable.

SUMMARY

These and other drawbacks and disadvantages of the prior art are addressed by the present principles, which are directed to methods and apparatus for adaptive probability update for non-coded syntax.

According to an aspect of the present principles, there is provided an apparatus. The apparatus includes an encoder for encoding picture data for at least a block. The encoder applies a probability update process to at least one of a non-coded symbol and a non-coded syntax associated with the block.

According to another aspect of the present principles, there is provided a method in a video encoder. The method includes encoding picture data for at least a block. The encoding step includes applying a probability update process to at least one of a non-coded symbol and a non-coded syntax associated with the block.

According to yet another aspect of the present principles, there is provided an apparatus. The apparatus includes a decoder for decoding picture data for at least a block. The decoder applies a probability update process to at least one of a non-coded symbol and a non-coded syntax associated with the block.

According to still another aspect of the present principles, there is provided a method in a video decoder. The method includes decoding picture data for at least a block. The decoder applies a probability update process to at least one of a non-coded symbol and a non-coded syntax associated with the block.

These and other aspects, features and advantages of the present principles will become apparent from the following detailed description of exemplary embodiments, which is to be read in connection with the accompanying drawings.

BRIEF DESCRIPTION OF THE DRAWINGS

The present principles may be better understood in accordance with the following exemplary figures, in which.

DETAILED DESCRIPTION

The present principles are directed to methods and apparatus for adaptive probability update for non-coded syntax.

The present description illustrates the present principles. It will thus be appreciated that those skilled in the art will be able to devise various arrangements that, although not explicitly described or shown herein, embody the present principles and are included within its spirit and scope.

All examples and conditional language recited herein are intended for pedagogical purposes to aid the reader in understanding the present principles and the concepts contributed by the inventor(s) to furthering the art, and are to be construed as being without limitation to such specifically recited examples and conditions.

Moreover, all statements herein reciting principles, aspects, and embodiments of the present principles, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the present principles. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The present principles as defined by such claims reside in the fact that the functionalities provided by the various recited means are combined and brought together in the manner which the claims call for. It is thus regarded that any means that can provide those functionalities are equivalent to those shown herein.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Moreover, it is to be appreciated that while one or more embodiments of the present principles are described herein with respect to the MPEG-4 AVC standard, the present principles are not limited to solely this standard and, thus, may be utilized with respect to other video coding standards, recommendations, and extensions thereof, including extensions of the MPEG-4 AVC standard, that use arithmetic coding or any other entropy coding methods that adapt to statistics, while maintaining the spirit of the present principles.

As used herein, "high level syntax" refers to syntax present in the bitstream that resides hierarchically above the macroblock layer. For example, high level syntax, as used herein, may refer to, but is not limited to, syntax at the slice header level, Supplemental Enhancement Information (SEI) level, Picture Parameter Set (PPS) level, Sequence Parameter Set (SPS) level and Network Abstraction Layer (NAL) unit header level.

Also, as used herein, the words "picture" and "image" are used interchangeably and refer to a still image or a picture from a video sequence. As is known, a picture may be a frame or a field.

Additionally, as used herein, the word "signal" refers to indicating something to a corresponding decoder. For example, the encoder may signal a particular one of a group of symbols and/or syntaxes in order to make the decoder aware of which particular symbols and/or syntaxes had their respective probabilities updated on the encoder side. In this way, the same symbols and/or/syntaxes may be similarly and/or accordingly and/or complimentarily processed at both the encoder side and the decoder side. Thus, for example, an encoder may transmit a particular symbol and/or syntax to the decoder so that the decoder may use and/or identify the same particular symbol and/or syntax (the preceding corresponding to an explicit approach involving explicit indicia) or, if the decoder already has the particular symbol and/or syntax as well as others, then signaling may be used (without transmitting) to simply allow the decoder to know and select the particular symbol and/or syntax (the preceding corresponding to an implicit approach involving implicit indicia). By avoiding transmission of any actual symbols and/or syntaxes, a bit savings may be realized. It is to be appreciated that signaling may be accomplished in a variety of ways. For example, one or more syntax elements, flags, and so forth may be used to signal information to a corresponding decoder.

Figure 1:
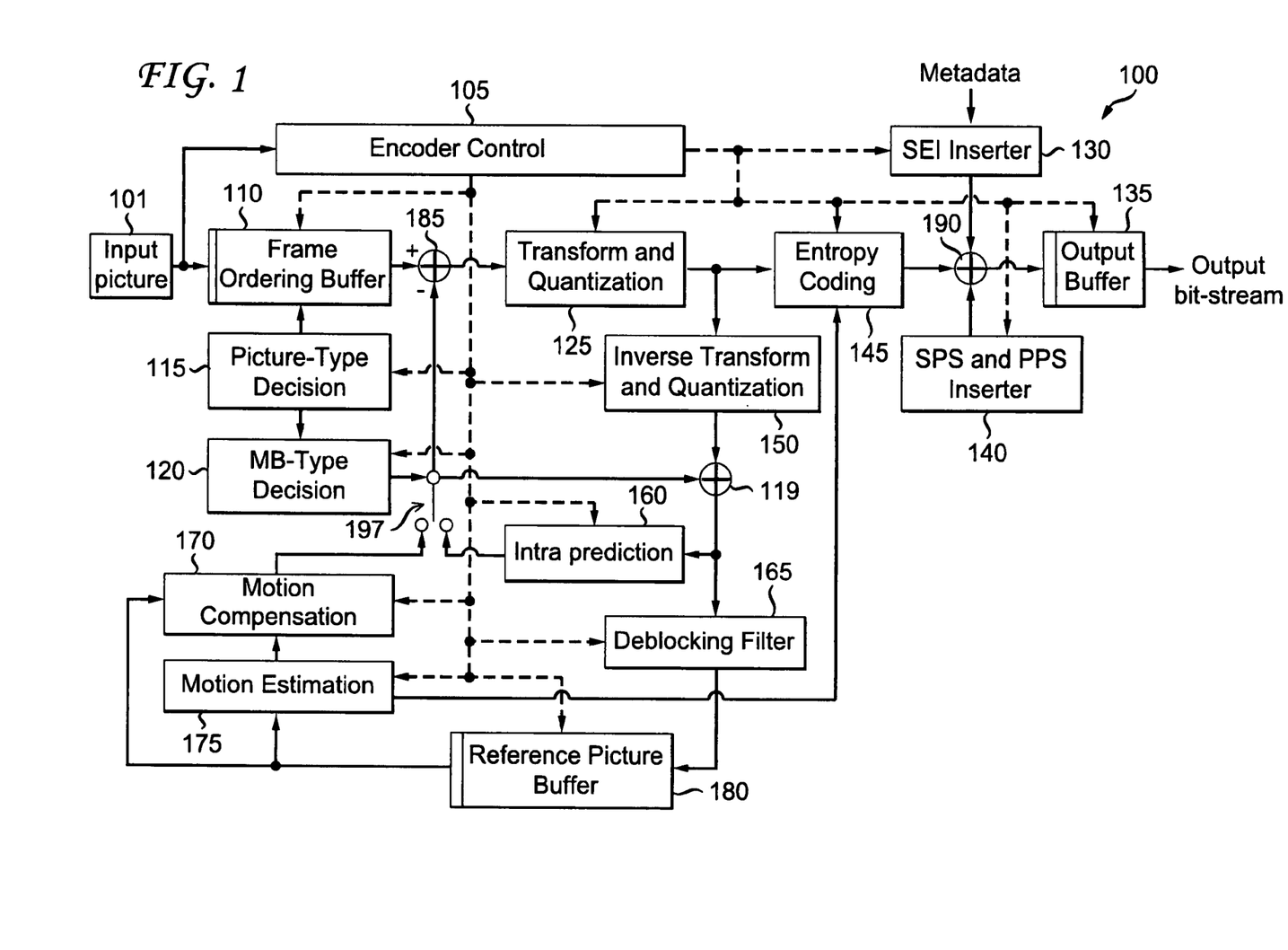
FIG. 1 is a block diagram for an exemplary video encoder to which the present principles may be applied in accordance with an embodiment of the present principles.

Turning to FIG. 1, an exemplary video encoder to which the present principles may be applied in accordance with an embodiment of the present principles is indicated generally by the reference numeral 100.

The video encoder 100 includes a frame ordering buffer 110 having an output in signal communication with a non-inverting input of a combiner 185. An output of the combiner 185 is connected in signal communication with a first input of a transformer and quantizer 125. An output of the transformer and quantizer 125 is connected in signal communication with a first input of an entropy coder 145 and a first input of an inverse transformer and inverse quantizer 150. An output of the entropy coder 145 is connected in signal communication with a first non-inverting input of a combiner 190. An output of the combiner 190 is connected in signal communication with a first input of an output buffer 135.

A first output of an encoder controller 105 is connected in signal communication with a second input of the frame ordering buffer 110, a second input of the inverse transformer and inverse quantizer 150, an input of a picture-type decision module 115, an input of a macroblock-type (MB-type) decision module 120, a second input of an intra prediction module 160, a second input of a deblocking filter 165, a first input of a motion compensator 170, a first input of a motion estimator 175, and a second input of a reference picture buffer 180.

A second output of the encoder controller 105 is connected in signal communication with a first input of a Supplemental Enhancement Information (SEI) inserter 130, a second input of the transformer and quantizer 125, a second input of the entropy coder 145, a second input of the output buffer 135, and an input of the Sequence Parameter Set (SPS) and Picture Parameter Set (PPS) inserter 140.

A first output of the picture-type decision module 115 is connected in signal communication with a third input of a frame ordering buffer 110. A second output of the picture-type decision module 115 is connected in signal communication with a second input of a macroblock-type decision module 120.

An output of the Sequence Parameter Set (SPS) and Picture Parameter Set (PPS) inserter 140 is connected in signal communication with a third non-inverting input of the combiner 190.

An output of the inverse quantizer and inverse transformer 150 is connected in signal communication with a first non-inverting input of a combiner 119. An output of the combiner 119 is connected in signal communication with a first input of the intra prediction module 160 and a first input of the deblocking filter 165. An output of the deblocking filter 165 is connected in signal communication with a first input of a reference picture buffer 180. An output of the reference picture buffer 180 is connected in signal communication with a second input of the motion estimator 175. A first output of the motion estimator 175 is connected in signal communication with a second input of the motion compensator 170. A second output of the motion estimator 175 is connected in signal communication with a third input of the entropy coder 145.

An output of the motion compensator 170 is connected in signal communication with a first input of a switch 197. An output of the intra prediction module 160 is connected in signal communication with a second input of the switch 197. An output of the macroblock-type decision module 120 is connected in signal communication with a third input of the switch 197. The third input of the switch 197 determines whether or not the "data" input of the switch (as compared to the control input, i.e., the third input) is to be provided by the motion compensator 170 or the intra prediction module 160. The output of the switch 197 is connected in signal communication with a second non-inverting input of the combiner 119 and with an inverting input of the combiner 185.

Inputs of the frame ordering buffer 110 and the encoder controller 105 are available as input of the encoder 100, for receiving an input picture 101. Moreover, an input of the Supplemental Enhancement Information (SEI) inserter 130 is available as an input of the encoder 100, for receiving metadata. An output of the output buffer 135 is available as an output of the encoder 100, for outputting a bitstream.

Figure 2:
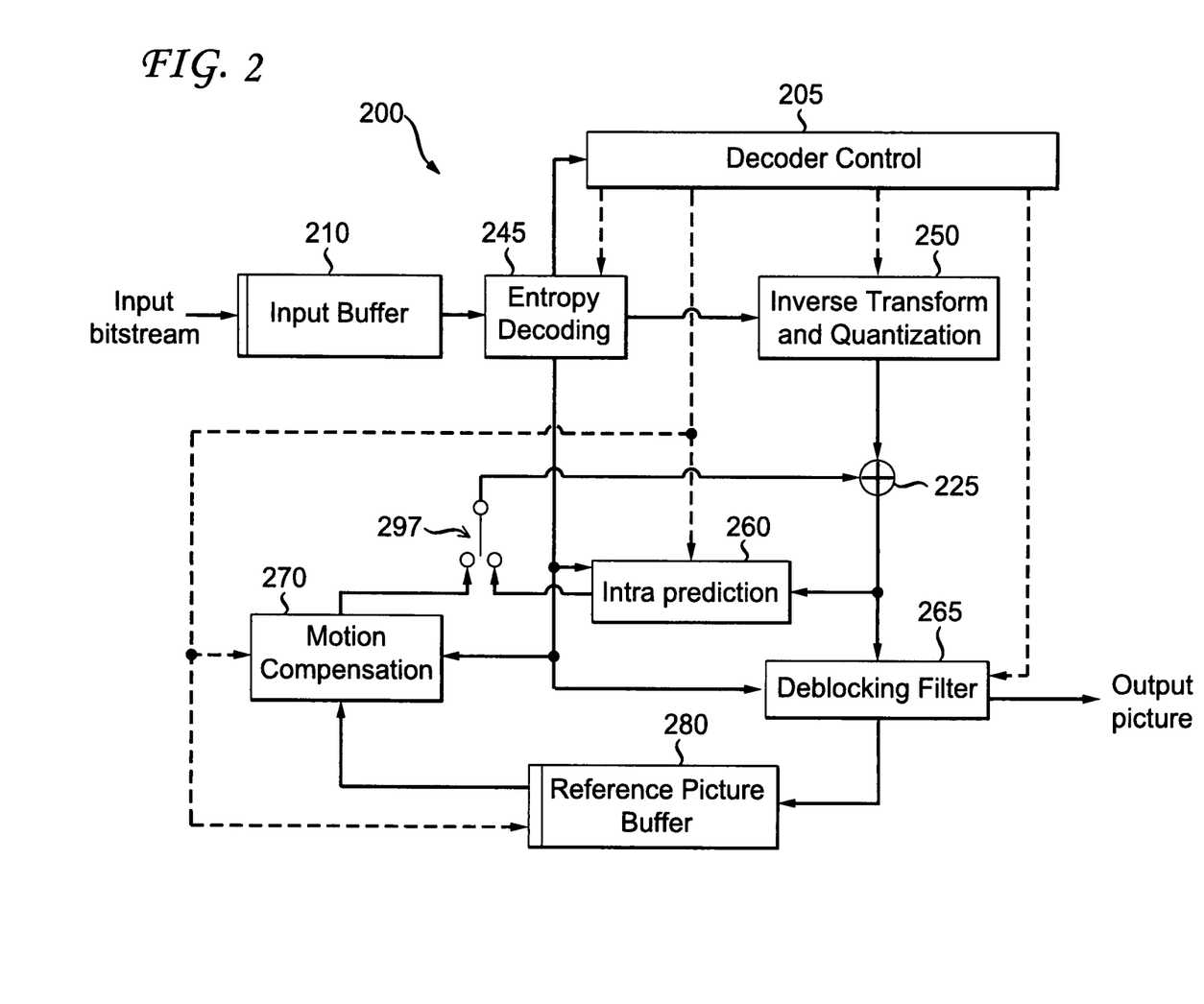
FIG. 2 is a block diagram for an exemplary video decoder to which the present principles may be applied in accordance with an embodiment of the present principles.

Turning to FIG. 2, an exemplary video decoder to which the present principles may be applied in accordance with an embodiment of the present principles is indicated generally by the reference numeral 200.

The video decoder 200 includes an input buffer 210 having an output connected in signal communication with a first input of the entropy decoder 245. A first output of the entropy decoder 245 is connected in signal communication with a first input of an inverse transformer and inverse quantizer 250. An output of the inverse transformer and inverse quantizer 250 is connected in signal communication with a second non-inverting input of a combiner 225. An output of the combiner 225 is connected in signal communication with a second input of a deblocking filter 265 and a first input of an intra prediction module 260. A second output of the deblocking filter 265 is connected in signal communication with a first input of a reference picture buffer 280. An output of the reference picture buffer 280 is connected in signal communication with a second input of a motion compensator 270.

A second output of the entropy decoder 245 is connected in signal communication with a third input of the motion compensator 270 and a first input of the deblocking filter 265. A third output of the entropy decoder 245 is connected in signal communication with an input of a decoder controller 205. A first output of the decoder controller 205 is connected in signal communication with a second input of the entropy decoder 245. A second output of the decoder controller 205 is connected in signal communication with a second input of the inverse transformer and inverse quantizer 250. A third output of the decoder controller 205 is connected in signal communication with a third input of the deblocking filter 265. A fourth output of the decoder controller 205 is connected in signal communication with a second input of the intra prediction module 260, with a first input of the motion compensator 270, and with a second input of the reference picture buffer 280.

An output of the motion compensator 270 is connected in signal communication with a first input of a switch 297. An output of the intra prediction module 260 is connected in signal communication with a second input of the switch 297. An output of the switch 297 is connected in signal communication with a first non-inverting input of the combiner 225.

An input of the input buffer 210 is available as an input of the decoder 200, for receiving an input bitstream. A first output of the deblocking filter 265 is available as an output of the decoder 200, for outputting an output picture.

As noted above, the MPEG-4 AVC Standard employs SKIP/Direct mode, which assumes that certain syntax can be inferred from already available decoded information, so we do not need to code the syntax at all. However, in some cases, we find out that this can cause some damage in future coding of the corresponding syntax. In at least one embodiment, the preceding problem is addressed by updating the probability estimate for a given syntax/symbol even when the syntax/symbol is not coded (e.g., for any macroblocks/blocks in a given slice).

In an embodiment, we apply the present principles to SKIP mode and Direct mode of the MPEG-4 AVC Standard. Even though mode, motion and coefficient syntax is not typically coded in SKIP mode, and mode and motion syntax is not typically coded in Direct mode, in the embodiment we still update the probability for these un-coded syntax elements.

Figure 3:
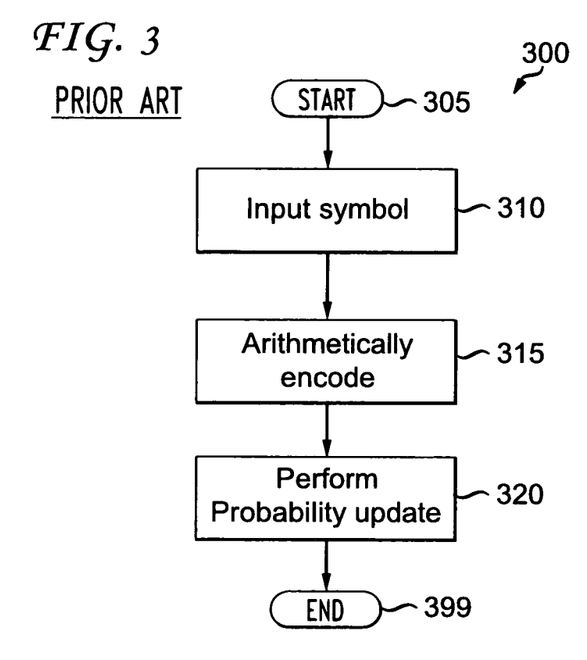
FIG. 3 is a flow diagram for a method for updating a probability for an input symbol in a regular coding process.

Turning to FIG. 3, a method for updating a probability for an input symbol in a regular (conventional) coding process is indicated generally by the reference numeral 300. The method 300 includes a start block 305 that passes control to a function block 310. The function block 310 receives the input symbol, and passes control to a function block 315. The function block 315 arithmetically codes the input symbol, and passes control to a function block 320. The function block 320 updates the probability for the input symbol, and passes control to an end block 399.

Figure 4:
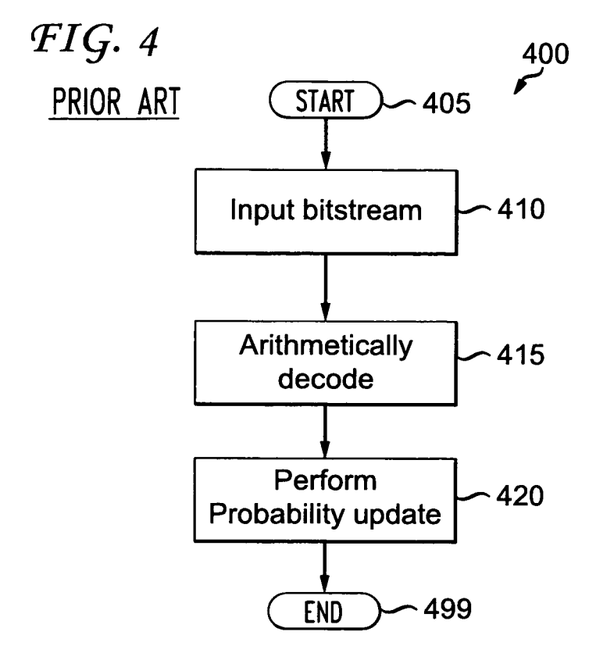
FIG. 4 is a flow diagram for a method for updating a probability for an input symbol in a regular decoding process.

Turning to FIG. 4, a method for updating a probability for an input symbol in a regular (conventional) decoding process is indicated generally by the reference numeral 400. The method 400 includes a start block 405 that passes control to a function block 410. The function block 410 receives an input bitstream that includes the input symbol, and passes control to a function block 415. The function block 415 arithmetically decodes the input symbol, and passes control to a function block 420. The function block 420 updates the probability for the input symbol, and passes control to an end block 499.

Figure 5:
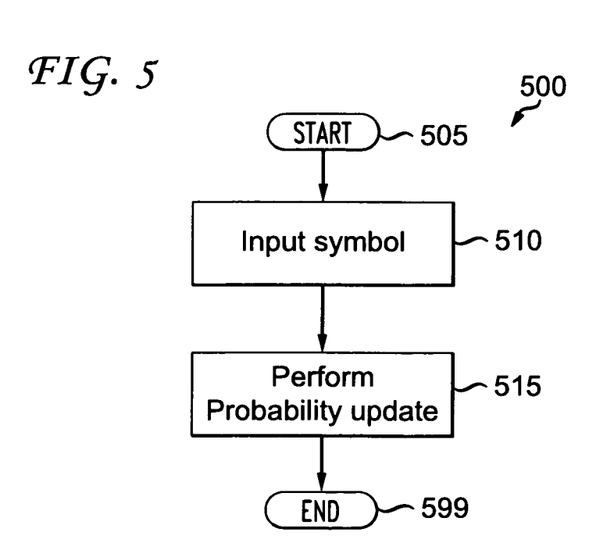
FIG. 5 is a flow diagram for an exemplary method for updating a probability for an input symbol without encoding or decoding the symbol in accordance with an embodiment of the present principles.

Turning to FIG. 5, an exemplary method for updating a probability for an input symbol without encoding or decoding the symbol in accordance with an embodiment of the present principles is indicated generally by the reference numeral 500. The method 500 includes a start block 505 that passes control to a function block 510. The function block 510 receives the input symbol, and passes control to a function block 515. The function block 515 updates the probability for the input symbol, and passes control to an end block 599. It is to be appreciated that the method 500 can be performed at an encoder and/or a decoder.

In an embodiment, the present principles can be applied to the encoding process of the significance level of the residue coefficients. The significance of a coefficient indicates whether the coefficient is zero or non-zero. The level of the non-zero coefficients is encoded. Usually, coefficient significance is encoded in a significance map, which indicates the significance of each of the residue coefficients. One way to implement the significant map involves the following: if a set of coefficients has at least one significant coefficient, then a "1" is arithmetically coded using the right context. After that, the set is divided into two subsets. For each subset, a "1" or a "0" is also encoded indicating whether the subset has at least one significant coefficient. This process is iterated until the entire significance map is sent. Note that if a "0" is encoded for a set, then that means that all the coefficients are zero, and, thus, there is no need to further partition the set. Also, note that a different symbol probability can be applied to each set size, and also, for each set size, a probability can be applied depending on the location of the set within the significance map.

Given this example, in an embodiment, the present principles can be applied in the following way. Presume that a set is coded as "1", so that there is at least one significant coefficient in the set, and, thus, the set is partitioned. Also, presume that the first subset of the set has all coefficients equal to zero, so the symbol "0" for that sub-set is arithmetically coded. Then, it is clear that the second sub-set has a significant coefficient, since there is at least one non-zero coefficient in the set and that at least one non-zero coefficient has not been found in the first subset. Consequently, there is no need to code a "1" for the second subset, because the decoder can deduce the symbol value "1" in this particular situation. However, without encoding this symbol, encoder and decoder can both update the probability of the symbol, since the value is known for both. This update process helps to provide a more accurate probability estimation and, thus, better encoding efficiency.

In another embodiment, we do not apply the probability update process to all the un-coded syntax in SKIP/Direct modes. Instead, we can either explicitly identify which syntax/symbol to which the present principles will be applied. Alternatively, we can implicitly derive if we need to apply the present principles to certain un-coded syntax during the coding process.

In an embodiment, for explicit coding, we can specify which un-coded symbol/syntax to which the present principles will be applied using, for example, one or more high level syntax elements (e.g., a slice header, SEI message, PPS, SPS, NAL unit header, and/or so forth).

In another embodiment, we implicitly derive if we need to apply the present principles to the un-coded symbol/syntax based on one or more of the following: the convergence speed of the corresponding probability; the position of the current block/macroblock (if the current block/macroblock is at the beginning of a slice, then do not apply the present principles; if the current block/macroblock is at the end of the slice, then apply the present principles), the probability state of the spatial-temporal neighboring blocks for the same symbol, the number of symbols and/or syntaxes already encoded (e.g., for the block, macroblock, slice, picture, video sequence, and so forth), and the number of times a particular symbol has been encoded for a specific syntax element, and so forth.

Syntax

TABLE 1 shows exemplary syntax for adaptive probability update for a sequence parameter set (SPS), in accordance with an embodiment of the present principles. TABLE 2 shows exemplary syntax for adaptive probability update for a slice header, in accordance with an embodiment of the present principles.

adaptive_probability_update_present_flag: adaptive_probability_update_present_flag equal to 0 means no adaptive update is performed for the probability context of the non-coded syntax in the sequence; adaptive_probability_update_present_flag equal to 1 means adaptive update is performed for the probability context of all or part of the non-coded syntax in the sequence.

number_updated_probability_context: number_updated_probability_context specifies the number of non-coded syntax of which the probability context is adaptively updated.

index_updated_probability_context: each element in array index_updated_probability_context specifies a probability context index. Each index is associated with a syntax which may not be coded in certain situations.

adaptive_probability_update_flag: adaptive_probability_update_flag equal to 0 means no adaptive update is performed for the probability context of the non-coded syntax in the slice; adaptive_probability_update equal to 1 means adaptive update is performed for the probability context of all or part of the non-coded syntax in the slice.

TABLE 1

| seq_parameter_set_rbsp ( ){ | Descriptor |
|---|---|
| ... | |
| adaptive_probability_update_present_flag | u(1) |
| if (adaptive_probability_update_present_flag = =1) | |
| { | |
| number_updated_probability_context | ue(v) |
| for(i=0; i < number_updated_ probability_context; i++) | |
| index_updated_ probability _context[i] | ue(v) |
| } | |
| .... | |
| } | |

TABLE 2

| slice_header ( ){ | Descriptor |
|---|---|
| .... | |
| adaptive_probability_update_flag | u(1) |
| .... | |
| } | |

Figure 6:
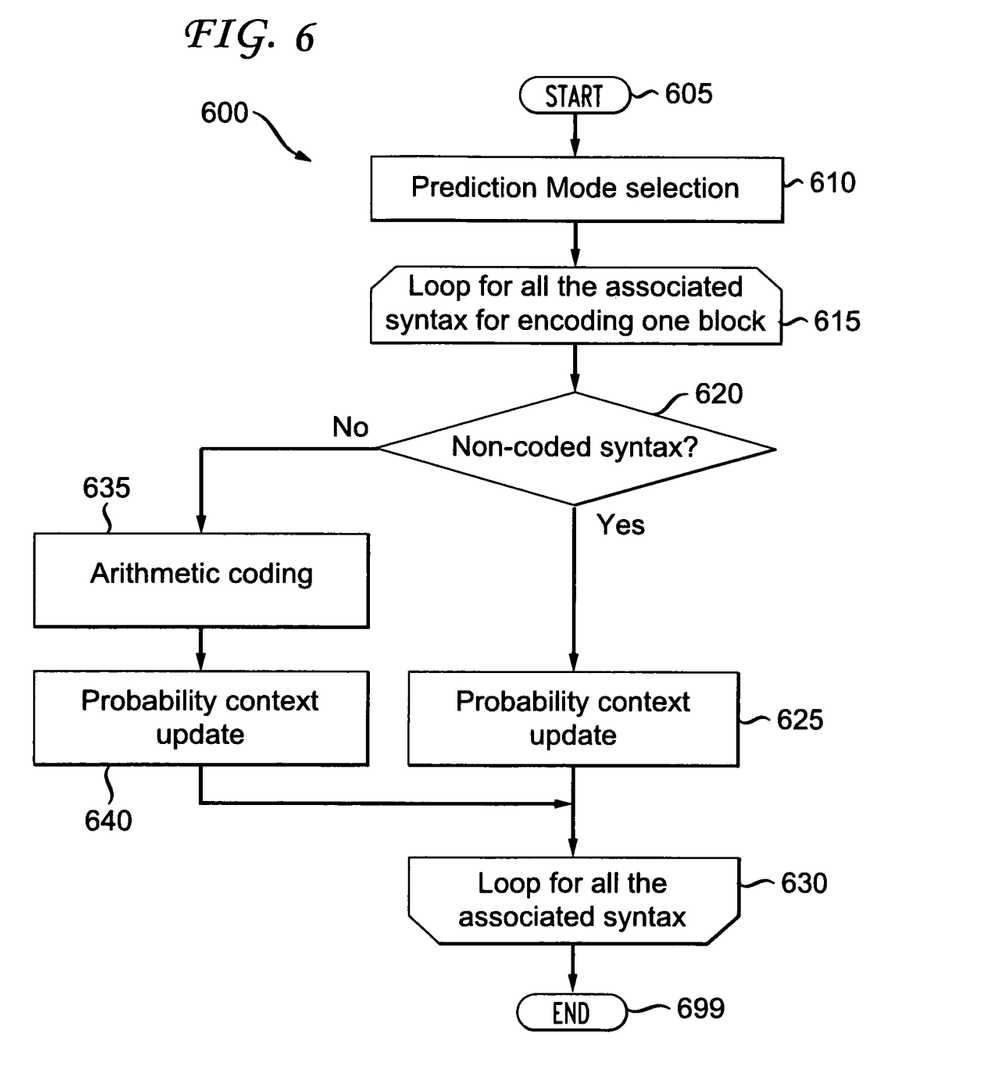
FIG. 6 is a flow diagram for an exemplary method for performing an adaptive probability update for non-coded syntax at an encoder in accordance with an embodiment of the present principles.

Turning to FIG. 6, an exemplary method for performing an adaptive probability update for non-coded syntax at an encoder in accordance with an embodiment of the present principles is indicated generally by the reference numeral 600. The method 600 includes a start block 605 that passes control to a function block 610. The function block 610 performs a prediction mode selection, and passes control to a loop limit block 615. The loop limit block 615 begins a loop for all associated syntax for encoding one block, and passes control to a decision block 620. The decision block 620 determines whether or not the current syntax is non-coded syntax. If so, then control is passed to a function block 625. Otherwise, control is passed to a function block 635.

The function block 625 performs a probability context update, and passes control to a loop limit block 630. The loop limit block 630 ends the loop for all associated syntax, and passes control to an end block 699.

The function block 635 performs arithmetic coding, and passes control to a function block 640. The function block 640 performs a probability context update, and passes control to the loop limit block 640.

Figure 7:
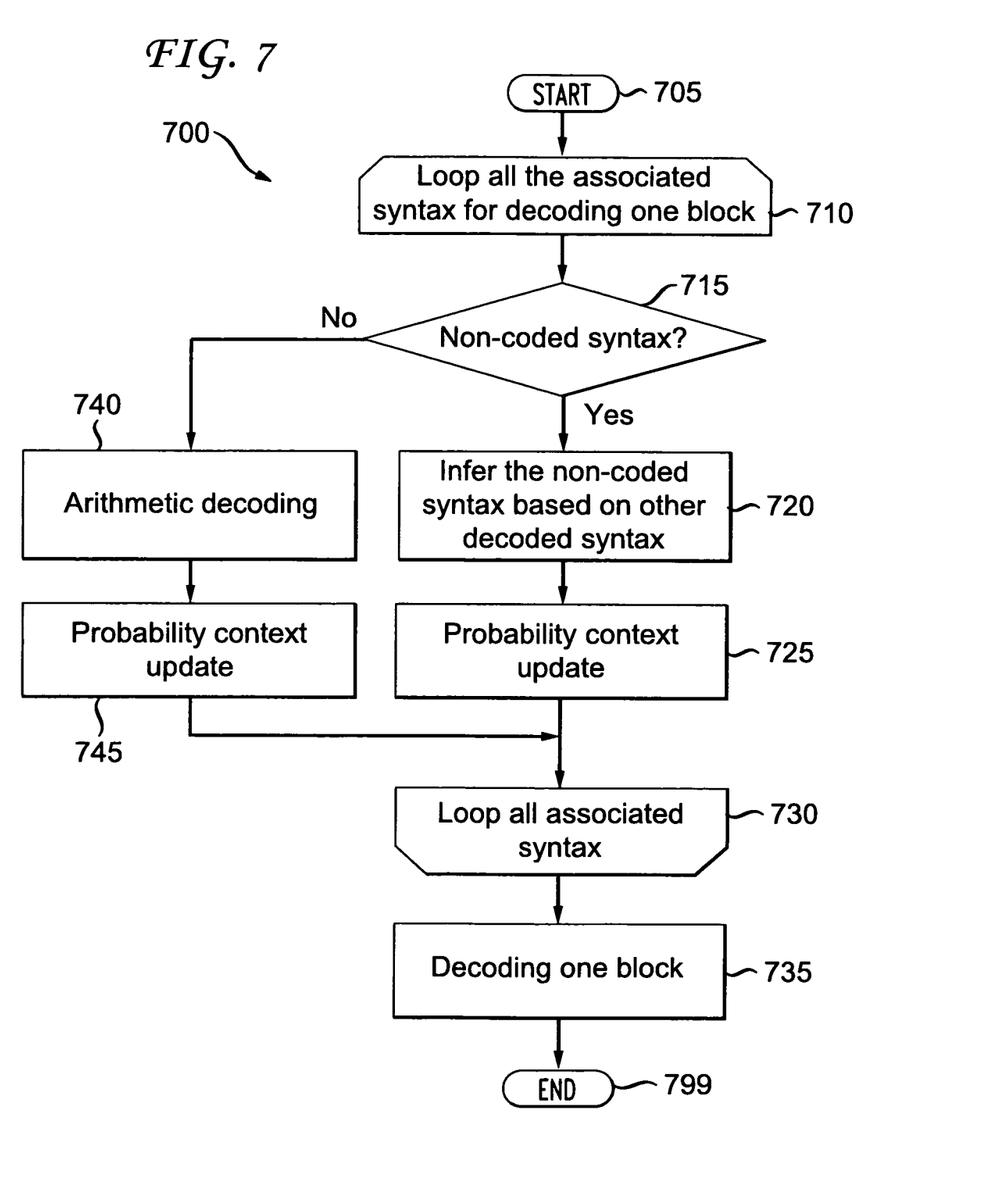
FIG. 7 is a flow diagram for an exemplary method for performing an adaptive probability update for non-coded syntax at a decoder in accordance with an embodiment of the present principles.

Turning to FIG. 7, an exemplary method for performing an adaptive probability update for non-coded syntax at a decoder in accordance with an embodiment of the present principles is indicated generally by the reference numeral 700. The method 700 includes a start block 705 that passes control to a loop limit block 710. The loop limit block 710 begins a loop for all associate syntax for decoding one block, and passes control to a decision block 715. The decision block 715 determines whether or not the current syntax is non-coded syntax. If so, then control is passed to a function block 720. Otherwise, control is passed to a function block 740.

The function block 720 infers the non-coded syntax based on other decoded syntax, and passes control to a function block 725. The function block 725 performs a probability context update, and passes control to a loop limit block 730.

The loop limit block 730 ends the loop over all associated syntax, and passes control to a function block 735. The function block 735 decodes one block, and passes control to an end block 799.

The function block 740 performs arithmetic decoding, and passes control to a function block 745. The function block 745 performs a probability context update, and passes control to the loop limit block 730.

Figure 8:
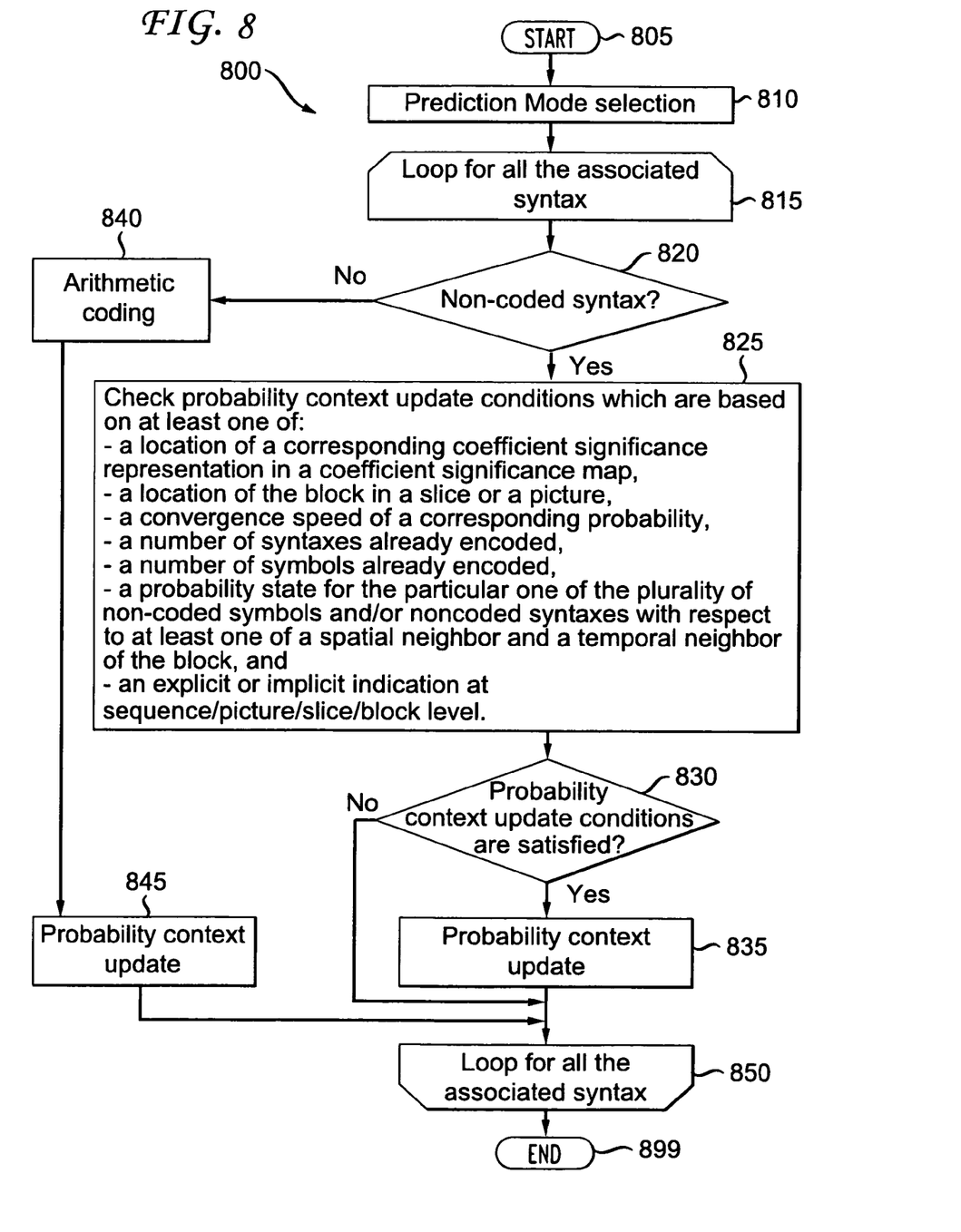
FIG. 8 is a flow diagram for another exemplary method for performing an adaptive probability update for non-coded syntax at an encoder in accordance with an embodiment of the present principles.

Turning to FIG. 8, another exemplary method for performing an adaptive probability update for non-coded syntax at an encoder in accordance with an embodiment of the present principles is indicated generally by the reference numeral 800. The method 800 includes a start block 805 that passes control to a function block 810. The function block 810 performs a prediction mode selection, and passes control to a loop limit block 815. The loop limit block 815 begins a loop for all the associated syntax, and passes control to a decision block 820. The decision block 820 determines whether or not there is any non-coded syntax. If so, then control is passed to a function block 825. Otherwise, control is passed to a function block 840.

The function block 825 checks the probability context update conditions which are based on at least one of a location of a corresponding coefficient significance representation in a coefficient significance map, a location of the block in a slice or a picture, a convergence speed of a corresponding probability, a number of syntaxes already encoded, a number of symbols already encoded, a probability state for the particular one of the plurality of non-coded symbols and/or non-coded syntaxes with respect to at least one of a spatial neighbor and a temporal neighbor of the block, and an explicit or implicit indication at the sequence/picture/slice/block level, and passes control to a decision block 830. The decision block 830 determines whether or not the probability context update conditions are satisfied. If so, then control is passed to a function block 835. Otherwise, control is passed to a loop limit block 850.

The function block 835 performs a probability context update, and passes control to the loop limit block 850. The loop limit block 850 ends the loop, and passes control to an end block 899.

The function block 840 performs arithmetic coding, and passes control to a function block 845. The function block 845 performs a probability context update, and passes control to the loop limit block 850.

Figure 9:
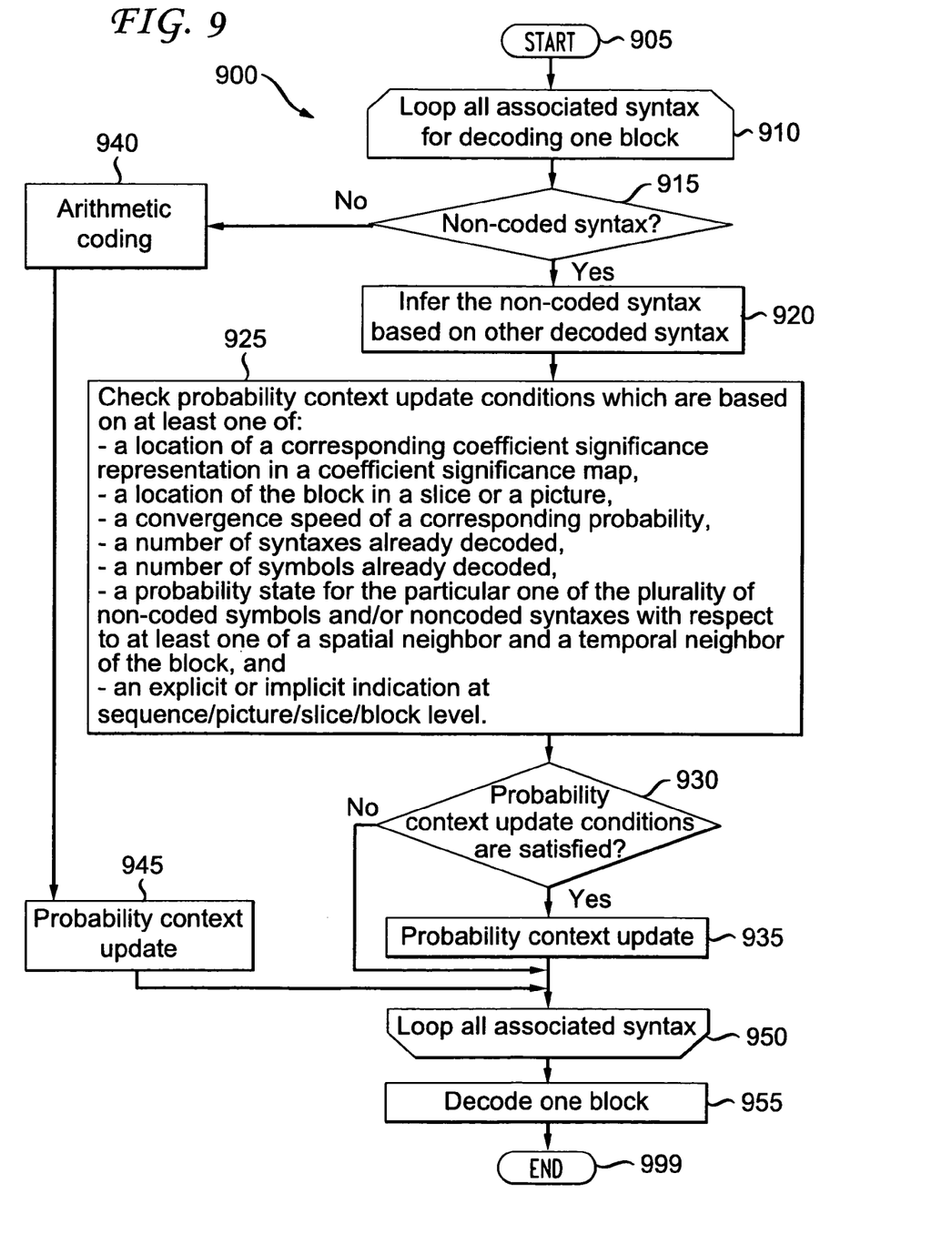
FIG. 9 is a flow diagram for another exemplary method for performing an adaptive probability update for non-coded syntax at a decoder in accordance with an embodiment of the present principles.

Turning to FIG. 9, another exemplary method for performing an adaptive probability update for non-coded syntax at a decoder in accordance with an embodiment of the present principles is indicated generally by the reference numeral 900. The method 900 includes a start block 905 that passes control to a loop limit block 910. The loop limit block 910 begins a loop over all associated syntax for decoding one block, and passes control to a decision block 915. The decision block 915 determines whether there is any non-encoded syntax. If so, then control is passed to a function block 920. Otherwise, control is passed to a function block 940.

The function block 920 infers the non-coded syntax based on other decoded syntax, and passes control to a function block 925. The function block 925 checks the probability context update conditions which are based on at least one of a location of a corresponding coefficient significance representation in a coefficient significance map, a location of the block in a slice or a picture, a convergence speed of a corresponding probability, a number of syntaxes already decoded, a number of symbols already decoded, a probability state for the particular one of the plurality of non-coded symbols and/or non-coded syntaxes with respect to at least one of a spatial neighbor and a temporal neighbor of the block, and an explicit or implicit indication at the sequence/picture/slice/block level, and passes control to a decision block 930. The decision block 930 determines whether or not the probability context update conditions are satisfied. If so, then control is passed to a function block 935. Otherwise, control is passed to a loop limit block 950.

The function block 935 performs a probability context update, and passes control to a loop limit block 950.

The loop limit block 950 ends the loop, and passes control to a function block 955. The function block 955 decodes one block, and passes control to an end block 999.

The function block 940 performs arithmetic decoding, and passes control to a function block 945. The function block 945 performs a probability context update, and passes control to the loop limit block 950.

A description will now be given of some of the many attendant advantages/features of the present invention, some of which have been mentioned above. For example, one advantage/feature is an apparatus having an encoder for encoding picture data for at least a block. The encoder applies a probability update process to at least one of a non-coded symbol and a non-coded syntax associated with the block.

Another advantage/feature is the apparatus having the encoder as described above, wherein the probability update process is selectively applied with respect to a plurality of non-coded symbols and non-coded syntaxes relating to at least the block.

Yet another advantage/feature is the apparatus having the encoder wherein the probability update process is selectively applied with respect to a plurality of non-coded symbols and non-coded syntaxes relating to at least the block as described above, wherein at least one of a selected non-coded symbol and a selected non-coded syntax is explicitly signaled.

Still another advantage/feature is the apparatus having the encoder wherein the probability update process is selectively applied with respect to a plurality of non-coded symbols and non-coded syntaxes relating to at least the block as described above, wherein at least one of a selected non-coded symbol and a selected non-coded syntax is implicitly signaled.

Moreover, another advantage/feature is the apparatus having the encoder wherein the probability update process is selectively applied with respect to a plurality of non-coded symbols and non-coded syntaxes relating to at least the block as described above, wherein a selection of whether to apply the probability update process to a particular one of the plurality of non-coded symbols and non-coded syntaxes relating to the block is responsive to at least one of a location of a corresponding coefficient significance representation in a coefficient significance map, a location of the block in a slice or a picture, a convergence speed of a corresponding probability, a number of syntaxes already encoded, a number of symbols already encoded, and a probability state for the particular one of the plurality of non-coded symbols and non-coded syntaxes with respect to at least one of a spatial neighbor and a temporal neighbor of the block.

Further, another advantage/feature is the apparatus having the encoder wherein the probability update process is selectively applied with respect to a plurality of non-coded symbols and non-coded syntaxes relating to at least the block as described above, wherein a selection of whether to apply the probability update process to a particular symbol of the plurality of non-coded symbols and non-coded syntaxes relating to the block is responsive to how many times the particular symbol has been encoded for a particular syntax.

Also, another advantage/feature is the apparatus having the encoder as described above, wherein the probability update process is applied on a sequence level, a picture level, a slice level, and a block level.

Additionally, another advantage/feature is the apparatus having the encoder as described above, wherein an indication of at least one of whether the probability update process has been applied by the encoder and whether to apply to the probability update process at a decoder is explicitly or implicitly signaled.

These and other features and advantages of the present principles may be readily ascertained by one of ordinary skill in the pertinent art based on the teachings herein. It is to be understood that the teachings of the present principles may be implemented in various forms of hardware, software, firmware, special purpose processors, or combinations thereof.

Most preferably, the teachings of the present principles are implemented as a combination of hardware and software. Moreover, the software may be implemented as an application program tangibly embodied on a program storage unit. The application program may be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and a printing unit.

It is to be further understood that, because some of the constituent system components and methods depicted in the accompanying drawings are preferably implemented in software, the actual connections between the system components or the process function blocks may differ depending upon the manner in which the present principles are programmed. Given the teachings herein, one of ordinary skill in the pertinent art will be able to contemplate these and similar implementations or configurations of the present principles.

Although the illustrative embodiments have been described herein with reference to the accompanying drawings, it is to be understood that the present principles is not limited to those precise embodiments, and that various changes and modifications may be effected therein by one of ordinary skill in the pertinent art without departing from the scope or spirit of the present principles. All such changes and modifications are intended to be included within the scope of the present principles as set forth in the appended claims.

The invention claimed is:

1. An apparatus, comprising:
an encoder for encoding picture data for at least a block, wherein said encoder selectively applies a probability update process to at least one of a symbol and/or a syntax, which is not coded in SKIP or Direct mode, but associated with the block, based on a number of the symbols and/or syntaxes relating to at least the block that are already encoded, and on a probability state of spatial-temporal neighboring blocks for the same symbol, the convergence speed of a corresponding probability estimate, the position of the current block/macroblock within a slice, and the number of times a particular symbol has been encoded for a specific syntax element, wherein said probability estimate is updated for coding mode, motion and coefficient syntax not coded in SKIP mode, or mode and motion syntax not coded in Direct mode, so that additional coded symbols and/or syntax corresponding to these syntaxes use updated probability.

2. The apparatus of claim 1, wherein at least one of a selected non-coded symbol and/or a selected non-coded syntax is explicitly signaled.

3. The apparatus of claim 1, wherein at least one of a selected non-coded symbol and/or a selected non-coded syntax is implicitly determined.

4. The apparatus of claim 1, wherein a selection of whether to apply the probability update process to a particular symbol of the plurality of non-coded symbols and/or non-coded syntaxes relating to the block is responsive to how many times the particular symbol has been encoded for a particular syntax.

5. In a video encoder, a method, comprising:
encoding picture data for at least a block, wherein said encoding step comprises selectively applying a probability update process to at least one of a symbol and/or a syntax, which is not coded in SKIP or Direct mode, but associated with the block, based on a number of the symbols and/or syntaxes relating to at least the block that are already encoded, and on a probability state of spatial-temporal neighboring blocks for the same symbol, the convergence speed of a corresponding probability estimate, the position of the current block/macroblock within a slice, and the number of times a particular symbol has been encoded for a specific syntax element, wherein said probability estimate is updated for coding mode, motion and coefficient syntax not coded in SKIP mode, or mode and motion syntax not coded in Direct mode, so that additional coded symbols and/or syntax corresponding to these syntaxes use updated probability.

6. The method of claim 5, wherein at least one of a selected non-coded symbol and/or a selected non-coded syntax is explicitly signaled.

7. The method of claim 5, wherein at least one of a selected non-coded symbol and/or a selected non-coded syntax is implicitly determined.

8. The method of claim 5, wherein a selection of whether to apply the probability update process to a particular symbol of the plurality of non-coded symbols and/or non-coded syntaxes relating to the block is responsive to how many times the particular symbol has been encoded for a particular syntax.

9. An apparatus, comprising:
a decoder for decoding picture data for at least a block, wherein said decoder selectively applies a probability update process to at least one of a symbol and/or a syntax, which is not coded in SKIP or Direct mode, but associated with the block, based on a number of the symbols and/or syntaxes relating to at least the block that are already encoded, and on a probability state of spatial-temporal neighboring blocks for the same symbol, the convergence speed of a corresponding probability estimate, the position of the current block/macroblock within a slice, and the number of times a particular symbol has been encoded for a specific syntax element, wherein said probability estimate is updated for coding mode, motion and coefficient syntax not coded in SKIP mode, or mode and motion syntax not coded in Direct mode, so that additional coded symbols and/or syntax corresponding to these syntaxes use updated probability.

10. The apparatus of claim 9, wherein said decoder receives explicit indicia identifying at least one of a selected non-coded symbol and/or a selected non-coded syntax, and determines the at least one of a selected non-coded symbol and/or a selected non-coded syntax from the explicit indicia.

11. The apparatus of claim 9, wherein said decoder receives implicit indicia identifying at least one of a selected non-coded symbol and/or a selected non- coded syntax, and determines the at least one of a selected non-coded symbol and/or a selected non-coded syntax from the implicit indicia.

12. The apparatus of claim 9, wherein a selection of whether to apply the probability update process to a particular symbol of the plurality of non-coded symbols and/or non-coded syntaxes relating to the block is responsive to how many times the particular symbol has been encoded for a particular syntax.

13. The apparatus of claim 9, wherein the probability update process is applied on a sequence level, a picture level, a slice level, and/or a block level.

14. The apparatus of claim 9, wherein at least one of whether the probability update process has been applied by said encoder and whether to apply to the probability update process at the decoder is determined from explicit indicia or implicit indicia relating thereto.

15. In a video decoder, a method, comprising:
decoding picture data for at least a block, wherein said decoder selectively applies a probability update process to at least one of a symbol and/or a syntax, which is not coded in SKIP or Direct mode, but associated with the block, based on a number of the symbols and/or syntaxes relating to at least the block that are already encoded, and on a probability state of spatial-temporal neighboring blocks for the same symbol, the convergence speed of a corresponding probability estimate, the position of the current block/macroblock within a slice, and the number of times a particular symbol has been encoded for a specific syntax element, wherein said probability estimate is updated for coding mode, motion and coefficient syntax not coded in SKIP mode, or mode and motion syntax not coded in Direct mode, so that additional coded symbols and/or syntax corresponding to these syntaxes use updated probability.

16. The method of claim 15, further comprising:
receiving explicit indicia identifying at least one of a selected non-coded symbol and/or a selected non-coded syntax; and
determining the at least one of a selected non-coded symbol and/or a selected non-coded syntax from the explicit indicia.

17. The method of claim 15, further comprising:
receiving implicit indicia identifying at least one of a selected non-coded symbol and/or a selected non-coded syntax; and
determining the at least one of a selected non-coded symbol and/or a selected non-coded syntax from the implicit indicia.

18. The method of claim 15, wherein a selection of whether to apply the probability update process to a particular symbol of the plurality of non-coded symbols and/or non-coded syntaxes relating to the block is responsive to how many times the particular symbol has been encoded for a particular syntax.

19. A non-transitory storage media having video signal data encoded thereupon, comprising:
picture data encoded for at least a block in at least a slice or a picture, wherein a probability update process is selectively applied a probability update process to at least one of a symbol and/or a syntax, which is not coded in SKIP or Direct mode, but associated with the block, based on a number of the symbols and/or syntaxes relating to at least the block that are already encoded, and on a probability state of spatial-temporal neighboring blocks for the same symbol, the convergence speed of a corresponding probability estimate, the position of the current block/macroblock within a slice, and the number of times a particular symbol has been encoded for a specific syntax element, wherein said probability estimate is updated for coding mode, motion and coefficient syntax not coded in SKIP mode, or mode and motion syntax not coded in Direct mode, so that additional coded symbols and/or syntax corresponding to these syntaxes use updated probability.

* * * * *